United States Patent [19]
Tomiyama et al.

[11] Patent Number: 5,665,491
[45] Date of Patent: Sep. 9, 1997

[54] NONAQUEOUS SECONDARY BATTERY

[75] Inventors: Hideki Tomiyama; Masuo Kabutomori, both of Kanagawa, Japan

[73] Assignee: Fuji Photo Film Co., Ltd., Kanagawa, Japan

[21] Appl. No.: 764,728

[22] Filed: Dec. 10, 1996

[30] Foreign Application Priority Data

Dec. 11, 1995 [JP] Japan .................................. 7-321507

[51] Int. Cl.⁶ ........................................................ H01M 6/14
[52] U.S. Cl. ............................................ 429/194; 429/218
[58] Field of Search ................................. 429/194, 218, 429/232, 209, 94; 252/182.1

[56] References Cited

U.S. PATENT DOCUMENTS

| | | | |
|---|---|---|---|
| 4,828,834 | 5/1989 | Nagaura et al. | 429/194 |
| 5,240,794 | 8/1993 | Thackeray et al. | 429/224 |
| 5,296,319 | 3/1994 | Bito et al. | 429/194 |

FOREIGN PATENT DOCUMENTS

| | | |
|---|---|---|
| 63-121265 | 5/1988 | Japan . |
| 63-121264 | 5/1988 | Japan . |
| 8-50893 | 2/1996 | Japan . |

*Primary Examiner*—Anthony Skapars
*Attorney, Agent, or Firm*—Sughrue, Mion, Zinn, Macpeak & Seas

[57] ABSTRACT

A nonaqueous secondary battery is disclosed, comprising a positive electrode sheet having on a current collector an electrode material mixture layer containing a lithium-containing transition metal oxide as a positive electrode active material, a negative electrode sheet having on a current collector an electrode material mixture layer containing a negative electrode material capable of intercalating and deintercalating lithium, and a nonaqueous electrolyte containing a lithium salt, wherein in at least one of said positive electrode sheet and said negative electrode sheet, in the case of the positive sheet, a layer containing no positive electrode active material is provided between plural electrode material mixture layers containing the positve electrode active material or between the electrode material mixture layer and the current collector; and in the case of the negative electrode sheet, a layer containing no negative electrode material capable of intercalating and deintercalating lithium is provided between plural electrode material mixture layers containing the negative electrode material or between the electrode material mixture layer and the current collector.

12 Claims, 1 Drawing Sheet

5,665,491

NONAQUEOUS SECONDARY BATTERY

FIELD OF THE INVENTION

This invention relates to a nonaqueous secondary battery in which the flexibility of the positive electrode sheet is improved and an electrode material mixture of the positive electrode sheet is prevented from falling off the sheet on rolling up.

BACKGROUND OF THE INVENTION

In recent years, the demand for high-capacity secondary batteries, especially nonaqueous secondary batteries making use of lithium intercalation and deintercalation reactions, has been increasing as a power source of electronic equipment, such as potable telephones, video cameras and notebook personal computers. With the advancement of the functions of such electronic equipment, the secondary batteries have been desired to have higher capacity. The inventors of the present invention have previously achieved a high capacity by using a specific metal oxide having high lithium ion intercalating power as a negative electrode active material. However, since the ability of the positive electrode material remains non-improved, the proportion of the positive electrode active material to be charged in a battery must be increased in order to enjoy the high capacity, which means that the positive electrode sheet is to have an increased thickness.

A nonaqueous secondary battery usually comprises a positive electrode sheet and a negative electrode sheet which are laid one on another with a separator therebetween, rolled up, and put in a cylindrical battery case. In order to roll up the sheets into a true circular cylinder without generating cracks, the positive and negative electrode sheets must be flexible. In order to obtain a high capacity, the active material content in the electrode material mixture should be increased as high as possible. It follows that the electrode sheet has insufficient flexibility, and the thicker the layer of the mixture, the more liable is the sheet to generate cracks and the more liable is the active material to fall off the sheet. Therefore, it has been required to use a positive electrode sheet having improved flexibility in a system using a metal oxide negative electrode active material as in the present invention.

It has been proposed to coat a metallic current collector with an electrically conductive coating film comprising an electrically conductive filler, such as carbon black or metal powder, and a binder to prevent fall-off of the active material as disclosed in JP-A-63-121265 (the term "JP-A" as used herein means an "unexamined published Japanese patent application"), but the flexibility obtained by the electrically conductive coating film was still insufficient.

SUMMARY OF THE INVENTION

An object of the present invention is to provide a nonaqueous secondary battery in which the electrode sheet has improved in flexibility and fall-off of an electrode material mixture from the electrode sheet on rolling up is prevented.

The above object is accomplished by a nonaqueous secondary battery comprising a positive electrode sheet having an electrode material mixture layer containing a lithium-containing transition metal oxide as a positive electrode active material, a negative electrode sheet having an electrode material mixture layer containing a negative electrode material capable of intercalating and deintercalating lithium, and a nonaqueous electrolyte containing a lithium salt, wherein in at least one of the positive electrode sheet and the negative electrode sheet, in the case of the positive sheet, a layer containing no positive electrode active material is provided between plural electrode material mixture layers containing the positive electrode active material or between the electrode material mixture layer and a current collector; and in the case of the negative electrode sheet, a layer containing no negative electrode material capable of intercalating and deintercalating lithium is provided between plural electrode material mixture layers containing the negative electrode material or between the electrode material mixture layer and a current collector.

Preferred but non-limiting embodiments of the present invention include:

(1) A nonaqueous secondary battery comprising a positive electrode sheet having on a current collector an electrode material mixture layer containing a lithium-containing transition metal oxide as a positive electrode active material, a negative electrode sheet having on a current collector an electrode material mixture layer containing a negative electrode material capable of intercalating and deintercalating lithium, and a nonaqueous electrolyte containing a lithium salt, wherein in at least one of the positive electrode sheet and the negative electrode sheet, in the case of the positive sheet, a layer containing no positive electrode active material is provided between plural electrode material mixture layers containing the positive electrode active material or between the electrode material mixture layer and the current collector; and in the case of the negative electrode sheet, a layer containing no negative electrode material capable of intercalating and deintercalating lithium is provided between plural electrode material mixture layers containing the negative electrode material or between the electrode material mixture layer and the current collector.

(2) The nonaqueous secondary battery as described in (1) above, wherein at least one of the layer containing no positive electrode active material or no negative electrode material is further provided on the electrode material mixture layer.

(3) The nonaqueous secondary battery as described in (1) above, wherein a ratio of the coating weight of the electrode material mixture layer which is located above the layer containing no positive electrode active material or no negative electrode material to the coating weight of an electrode material mixture layer which is located under the layer containing no positive electrode active material or no negative electrode material is from 10:0 to 1:9.

(4) The nonaqueous secondary battery as described in (1), wherein at least one of the positive electrode sheet and negative electrode sheet is a positive electrode sheet comprising the layer containing no positive electrode active material.

(5) The nonaqueous secondary battery as described in (1), wherein the layer containing no positive electrode active material or no negative electrode material comprises at least one kind of electron conductive particles and at least one kind of electron non-conductive particles.

(6) The nonaqueous secondary battery as described in (5), wherein the layer containing no positive electrode active material or no negative electrode material contains 1 to 50% by weight of the electron conductive particles and 50 to 99% by weight of the electron non-conductive particles.

(7) The nonaqueous secondary battery as described in (5), wherein the electron conductive particles are particles consisting mainly of carbon, and the electron non-conductive particles are particles consisting mainly of an inorganic compound.

(8) The nonaqueous secondary battery as described in (1), wherein the positive electrode material mixture contains at least one lithium-containing transition metal composite oxide as a positive electrode active material.

(9) The nonaqueous secondary battery as described in (1), wherein the negative electrode material is a metal or semimetal oxide.

(10) The nonaqueous secondary battery as described in (9), wherein the negative electrode material comprises at least one oxide of a metal or semimetal belonging to the groups 13 to 15 of the Periodic Table.

(11) The nonaqueous secondary battery as described in (10), wherein the negative electrode material is a composite oxide represented by formula (I):

$$SnM^1_aO_t \qquad (I)$$

wherein $M^1$ represents two or more elements selected from the group consisting of Al, B, P, Si, Ge, the elements belonging to the groups 1, 2 and 3 of the Periodic Table, and halogen elements; a represents a number of form 0.2 to 2; and t represents a number of from 1 to 6.

(12) The nonaqueous secondary battery as described in (11), wherein the composite oxide is represented by formula (IV):

$$SnM^3_cM^4_dO_t \qquad (IV)$$

wherein $M^3$ represents at least one element selected from the group consisting of Al, B, P, and Ge; $M^4$ represents at least one element selected from the group consisiting of the elements belonging to the groups 1, 2 and 3 of the Periodic Table, and halogen elements; c represents a number of form 0.2 to 2; d represents a number of from 0.01 to 1; 0.2<c+d<2; and t represents a number of from 1 to 6.

DETAILED DESCRIPTION OF THE INVENTION

In the present invention, the layer containing no positive electrode active material can be provided between plural electrode material mixture layers containing the positive electrode active material (which may be plural layers) or between the electrode material mixture layer and a current collector in the positive sheet; the layer containing no negative electrode material capable of intercalating and deintercalating lithium can be provided between plural electrode material mixture layers containing the negative electrode material or between the electrode material mixure layer and a current collector in the negative sheet; and at least one layer containing no positive electrode active material and/or no negative electrode material may be provided in al least one electrode sheet of the positive sheet and the negative sheet. That is, the layer containing no positive electrode active material and no negative electrode material may provided in both the positive sheet and negative sheet, respectively. It is particularly preferred that only the layer containing no positive electrode active material is provided in the positive sheet.

The layer containing no positive electrode active material or no negative electrode material is preferably provided in an electrode sheet having an increased thickness of an electrode material mixture layer applied on a current collector. Further, the layer containing no positive electrode active material or no negative electrode material may be further provided on the electrode material mixture layer.

The layer containing no positive electrode active material or no negative electrode material is preferably an intermediate layer sandwiched in between upper and lower electrode material mixture layers or a lowermost layer in the electrode material mixture layers formed on a current collector, and particularly preferably a lowermost layer which is provided on the current collector. The ratio of the coating weight of the upper electrode material mixture layer to that of the lower electrode material mixture layer is preferably 10:0 to 1:9, still preferably 10:0 to 2:8. The thickness of the layer containing no positive electrode active material or no negative electrode material is preferably 0.8 to 50%, still preferably 1.5 to 40%, of the total thickness of the electrode material mixture layer(s).

The layer containing no positive electrode active material or no negative electrode material preferably comprises electron conductive particles, electron non-conductive particles, and a binder. Preferred examples of the electron conductive particles include carbon blacks, such as acetylene black, Ketjen black, and furnace black; graphites, such as natural graphite and artificial graphite; and metal powder. Preferred examples of the electron non-conductive particles preferably include aluminum oxide, titanium oxide, zirconium oxide, silicon dioxide, zirconium silicate, mica, kaolinite, smectite, and pyrophyllite. The binder can be any binder that is useful in the electrode material mixture layer and may be the same or different from the binder used in the electrode material mixture. Specific examples of suitable binders will be given later. The layer containing no positive electrode active material or no negative electrode material preferably comprises 1 to 50% by weight, particularly preferably 5 to 50% by weight, of the electron conductive particles and preferably 50 to 99% by weight, particularly preferably 50 to 95% by weight, of the electron non-conductive particles.

The positive or negative electrode sheet which can be used in the nonaqueous secondary battery of the present invention is prepared by applying a positive electrode material mixture or a negative electrode material mixture onto a current collector. The positive or negative electrode sheet may have other layers, such as a protective layer for mechanical or chemical protection of the electrode material mixture layer, in addition to the electrode material mixture layer containing a positive electrode active material or a negative electrode material and the layer containing no positive electrode active material or no negative electrode material.

The positive or negative electrode material mixture may contain, in addition to the positive electrode active material or the negative electrode material, an electrically conducting agent, a binder, a dispersant, an ion-conducting agent, a pressure-increasing agent, or other additives.

The positive electrode active material for use in the present invention is selected from compounds capable of intercalating and deintercalating light metal ions, particularly transition metal oxides and transition metal chalcogenides. Transition metal oxides are especially preferred. Lithium-containing transition metal oxides are most preferred.

Preferred examples of the transition metals include Ti, V, Cr, Mn, Fe, Co, Ni, Cu, Nb, Mo, and W. Of the compounds of these transition metals preferred are manganese dioxide, vanadium pentoxide, iron oxide, molybdenum oxide, molybdenum sulfide, cobalt oxide, iron sulfide, and titanium sulfide. These compounds may be used either individually or as a combination of two or more thereof. They can be used as a lithium-containing transition metal oxide.

A lithium compound and a transition metal compound may be mixed with a compound that enhances ion conductivity, such as a compound providing $Ca^{2+}$, or an amorphous network forming agent containing P, B or Si (e.g., $P_2O_5$, $Li_3PO_4$, $H_3BO_3$, $B_2O_3$, $SiO_2$) and calcined. A lithium compound and a transition metal compound may also be mixed with a compound having an alkali metal ion, e.g., Na, K or Mg, and/or a compound containing Si, Sn, Al, Ga, Ge, Ce, In, Bi, etc. and calcined.

Examples of preferred positive electrode active materials for used in the present invention are described in JP-A-61-5262, U.S. Pat. No. 4,302,518, JP-A-63-299056, JP-A-1-294364, JP-B-4-30146 (the term "JP-B" as used herein means an "examined Japanese patent publication"), U.S. Pat. Nos. 5,240,794 and 5,153,081, JP-A-4-328258, JP-A-5-54889. Typical positive electrode active materials are shown below for illustrative purposes only but not for limitation.

$Li_xCoO_2$, $Li_xNiO_2$, $Li_xCo_aNi_{1-a}O_2$, $Li_xCo_bV_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$, $Li_xMn_bFe_{1-b}O_z$, $Li_xCo_cB_{1-c}O_2$ (wherein x=0.05 to 1.2; a=0.1 to 0.9; b=0.8 to 0.98; c=0.85 to 0.99; and z=1.5 to 5).

The lithium-containing transition metal oxides can be synthesized by, for example, calcining a mixture of a lithium compound and a transition metal compound or a solution reaction of a lithium compound and a transition metal compound. The calcination method is preferred.

The calcination method can be carried out by referring to the details described, e.g., in JP-A-6-60867 and JP-A-7-14579. Calcination is preferably performed at 500° to 1500° C., still preferably 700° to 1200° C., particularly preferably 750° to 1000° C., for a period of 4 to 30 hours, still preferably 6 to 20 hours, particularly preferably 6 to 15 hours. If necessary, the positive electrode active material obtained by calcination is washed with water, an aqueous acid solution, an aqueous alkali solution or an organic solvent.

The lithium-containing transition metal oxides as a positive electrode active material can also be synthesized by introducing lithium ions into a transition metal oxide through reaction between a transition metal oxide with metallic lithium, a lithium alloy or butyl lithium.

While not limiting, it is preferable that the average particle size of the positive electrode active material is 0.1 to 50 μm and that at least 95% by volume of the particles have a particle diameter of 0.5 to 30 μm. It is still preferable that the proportion of the particles having a particle diameter of 3 μm or less is not more than 18% by volume and that the proportion of the particles having a particle diameter of 15 to 25 μm is not more than 18% by volume. The specific surface area of the positive electrode active material is not particularly limited but is preferably from 0.01 to 50 m²/g, particularly preferably 0.2 to 1 m²/g, as measured by a BET method. A supernatant liquid of a solution of 5 g of the active material in 100 ml of distilled water preferably has a pH of 7 to 12.

The negative electrode material which can be used in the present invention is a compound capable of intercalating and deintercalating light metal ions. Preferred negative electrode materials include light metals, light metal alloys, carbonaceous compounds, inorganic oxides, inorganic chalcogenides, metal complexes, and organic high polymers. These compounds may be used either individually or as a combination thereof. For example, a combination of a light metal and a carbonaceous compound, a combination of a light metal and an inorganic oxide, or a combination of a light metal, a carbonaceous compound, and an inorganic oxide compound can be preferably used. These combinations are effective in providing a high capacity, a high discharge potential, high safety, and satisfactory cycle characteristics.

Lithium is a preferred light metal. The light metal alloys include those containing a metal capable of forming an alloy with lithium and alloy containing lithium. Al, Al—Mn, Al—Mg, Al—Sn, Al—In, and Al—Cd are particularly preferred.

The carbonaceous compounds include natural graphite, artificial graphite, carbon by vapor phase growth, carbon of calcined organic substances, and the like, with those having a graphite structure being preferred. The carbonaceous compound may contain up to 10% by weight of a compound of an element other than carbon, e.g., B, P, N, S, SiC and $B_4C$.

Examples of elements which constitute the inorganic oxides or inorganic chalcogenides preferably include transition metals and the metals and semimetals belonging to the groups 13 to 15 of the Periodic Table.

Preferred examples of the transition metal compounds include an oxide, a composite oxide, a chalcogenide or composite chalcogenide of V, Ti, Fe, Mn, Co, Ni, Zn, W, and Mo. Still preferred transition metal compounds are $Li_pCo_qV_{1-q}O_r$, wherein p=0.1 to 2.5, q=0 to 1; and z=1.3 to 4.5, which are disclosed in JP-A-6-44972.

The compounds of metals or semimetals other than transition metals are selected from oxides, composite oxides, chalcogenides or composite chalcogenides containing an element of the groups 13 to 15 of the Periodic Table or a combination thereof. The elements of the groups 13 to 15 of the Periodic Table are Al, Ga, Si, Sn, Ge, Pb, Sb, and Bi.

Examples of these compounds include $Al_2O_3$, $Ga_2O_3$, SiO, $SiO_2$, GeO, $GeO_2$, SnO, $SnO_2$, $SnSiO_3$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O_5$, GeS, $GeS_2$, SnS, $SnS_2$, PbS, $Pbs_2$, $Sb_2S_3$, $Sb_2S_5$, and $SnSiS_3$. They may be a composite oxide containing lithium, e.g., $Li_2GeO_3$ and $Li_2SnO_2$.

It is preferable that the above-described composite chalcogenides and composite oxides are predominantly amorphous at the time of battery assembly. The term "predominantly amorphous" as used herein means that a substance has a broad scattering band having a peak at 20° to 40° in terms of 2θ in X-ray diffractometry using CuKα rays. The substance may have a diffraction line assigned to a crystalline structure. It is preferable that the maximum intensity of the band assigned to a crystalline structure which appears at 40° to 70° in terms of 2θ is not higher than 500 times, still preferably not higher than 100 times, particularly preferably not higher than 5 times, the peak intensity of the broad scattering band which appears at 20° to 40° in terms of 2θ. It is most preferred that the compound has no diffraction line attributed to a crystalline structure.

The composite chalcogenides and composite oxides are composite compounds containing two or more elements selected from transition metals and the elements of the groups 13 to 15 of the Periodic Table, particularly two or more elements selected from B, Al, Ga, In, Tl, Si, Ge, Sn, Pb, P, As, Sb, and Bi. The composite oxides are still preferred. Particularly preferred are composite oxides comprising mainly at least two elements selected from the group consisting of B, Al, Si, Ge, Sn, and P.

The composite chalcogenides or composite oxides may further contain an element of the groups 1 to 3 of the Periodic Table or a halogen element in order to modify the amorphous structure. They may also contain a transition metal element.

Preferred, of the above-mentioned negative electrode materials, are amorphous composite oxides mainly comprising tin which are represented by formulae (I) and (II) shown below.

$$SnM^1_aO_t \quad (I)$$

wherein $M^1$ represents at least two elements selected from the group consisting of Al, B, P, Si, Ge, the elements belonging to the groups 1, 2 and 3 of the Periodic Table, and halogen elements; a represents a number of form 0.2 to 2; and t represents a number of from 1 to 6.

$$Sn_xT_{1-x}M^1_aO_t \quad (II)$$

wherein $M^1$, a, and t are as defined above; T represents a transition metal selected from the group consisting of V, Ti, Fe, Mn, Co, Ni, Zn, W, and Mo; and x represents a number of 0.1 to 0.9.

Of the compounds represented by formula (I), those represented by formula (III) are still preferred:

$$SnM^2_bO_t \quad (III)$$

wherein $M^2$ represents at least two elements selected from the group consisting of Al, B, P, Ge, the elements belonging to the groups 1, 2 and 3 of the Periodic Table, and halogen elements; b represents a number of 0.2 to 2; and t represents a number of 1 to 6.

Of the compounds represented by formula (III), those of formula (IV) are particularly preferred:

$$SnM^3_cM^4_dO_t \quad (IV)$$

wherein $M^3$ represents at least one element selected from the group consisting of Al, B, P, and Ge; $M^4$ represents at least one element selected from the elements belonging to the groups 1, 2 and 3 of the Periodic Table and halogen elements; c represents a number of form 0.2 to 2; d represents a number of from 0.01 to 1; $0.2 < c+d < 2$; and t represents a number of from 1 to 6.

The amorphous composite oxides represented by formula (I) to (IV) can be synthesized by a calcination method or a solution method. A calcination method is preferred. In a preferred embodiment of the calcination method, oxides or compounds of the elements described in the formula (I) are mixed well and calcined.

Calcination is preferably carried out at a rate of temperature rise of 5° to 200° C./min and at a calcination temperature of 500° to 1500° C. for a period of 1 to 100 hours. After calcination, the system is cooled preferably at a rate of temperature drop of 2° to $10^{7°}$ C./min.

The term "rate of temperature rise" as used herein means an average rate of temperature rise of from 50% of the calcination temperature (° C.) up to 80% of the calcination temperature (° C.), and the term "rate of temperature drop" as used herein means an average rate of temperature drop of from 80% of the calcination temperature (° C.) to 50% of the calcination temperature (° C.).

Cooling of the calcined product may be conducted either within a calcining furnace or out of the furnace, for example, by pouring the product into water. Super-quenching methods described in *Ceramics Processing*, p. 217, Gihodo (1987), such as a gun method, a Hammer-Anvil method, a slap method, a gas atomizing method, a plasma spray method, a centrifugal quenching method, and a melt drag method, can also be used. Further, cooling may be conducted by a single roller method or a twin-roller method described in *New Glass Handbook*, p. 172, Maruzen (1991). Where the material melts during calcination, the calcined product may be withdrawn continuously while feeding the raw materials to the furnace. The melt is preferably stirred during calcination.

The calcining atmosphere preferably has an oxygen content of not more than 5% by volume. An inert gas atmosphere is still preferred. Examples of suitable inert gases include nitrogen, argon, helium, krypton, and xenon. Pure argon is most preferred.

The negative electrode material of the present invention preferably has an average particle size of 0.1 to 60 µm. Still preferably, the average particle size is 0.7 to 25 µm, and at least 60% by volume of the total particles have a particle size of from 0.5 to 30 µm. It is preferable that the proportion of the particles whose particle size is 1 µm or less is not more than 30% by volume and that the proportion of the particles whose particle size is 20 µm or greater is not more than 25% by volume. It is needless to say that the particle size of the negative electrode material used should not exceed the thickness of the electrode material mixture layer on each side of the negative electrode.

The calcined product can be adjusted to a prescribed size by grinding and/or classification by means of a mortar, a ball mill, a sand mill, a vibration ball mill, a satellite ball mill, a planetary ball mill, a spinning air flow type jet mill, a sieve, etc. If desired, grinding can be performed together with a grinding medium, such as water or an organic solvent (e.g., methanol). In order to adjust to a prescribed size, the ground particles are preferably classified either in a dry process or a wet process. For classification, an air classifier, a sieve, etc. can be used.

The term "average particle size" as used herein means a median diameter of primary particles, which can be measured with a laser diffraction type particle size distribution measuring apparatus.

Specific but non-limiting examples of the negative electrode material for use in the invention are shown below.

$SnAl_{0.4}B_{0.5}P_{0.5}K_{0.1}O_{3.65}$, $SnAl_{0.4}B_{0.5}P_{0.5}Na_{0.2}O_{3.7}$, $SnAl_{0.4}B_{0.3}P_{0.5}Rb_{0.2}O_{3.4}$, $SnAl_{0.4}B_{0.5}P_{0.5}Cs_{0.1}O_{3.65}$, $SnAl_{0.4}B_{0.5}P_{0.5}K_{0.1}Ge_{0.05}O_{3.85}$, $SnAl_{0.4}B_{0.5}P_{0.5}K_{0.1}Mg_{0.1}Ge_{0.02}O_{3.83}$, $SnAl_{0.4}B_{0.4}P_{0.4}O_{3.2}$, $SnAl_{0.3}B_{0.5}P_{0.2}O_{2.7}$, $SnAl_{0.3}B_{0.5}P_{0.2}O_{2.7}$, $SnAl_{0.4}B_{0.5}P_{0.3}Ba_{0.08}Mg_{0.08}O_{3.26}$, $SnAl_{0.4}B_{0.4}P_{0.4}Ba_{0.08}O_{3.28}$, $SnAl_{0.4}B_{0.5}P_{0.5}O_{3.6}$, $SnAl_{0.4}B_{0.5}P_{0.5}Mg_{0.1}O_{3.7}$ $SnAl_{0.5}B_{0.4}P_{0.5}Mg_{0.1}F_{0.2}O_{3.65}$, $SnB_{0.5}P_{0.5}Li_{0.1}Mg_{0.1}F_{0.2}O_{3.05}$, $SnB_{0.5}P_{0.5}K_{0.1}Mg_{0.1}F_{0.2}O_{3.05}$, $SnB_{0.5}P_{0.5}K_{0.05}Mg_{0.05}F_{0.1}O_{3.03}$, $SnB_{0.5}P_{0.5}K_{0.05}Mg_{0.1}F_{0.2}O_{3.03}$, $SnAl_{0.4}B_{0.5}P_{0.5}Cs_{0.1}Mg_{0.1}F_{0.2}O_{3.65}$, $SnB_{0.5}P_{0.5}Cs_{0.05}Mg_{0.05}F_{0.1}O_{3.03}$, $SnB_{0.5}P_{0.5}Mg_{0.1}F_{0.1}O_{3.05}$, $SnB_{0.5}P_{0.5}Mg_{0.1}F_{0.2}O_{3}$, $SnB_{0.5}P_{0.5}Mg_{0.1}F_{0.06}O_{3.07}$, $SnB_{0.5}P_{0.5}Mg_{0.1}F_{0.14}O_{3.03}$, $SnPBa_{0.08}O_{3.58}$, $SnPK_{0.1}O_{3.55}$, $SnPK_{0.05}Mg_{0.05}O_{3.58}$, $SnPCs_{0.1}O_{3.55}$, $SnPBa_{0.08}F_{0.08}O_{3.54}$, $SnPK_{0.1}Mg_{0.1}F_{0.2}O_{3.55}$, $SnPK_{0.05}Mg_{0.05}F_{0.1}O_{3.53}$, $SnPCs_{0.1}Mg_{0.1}F_{0.2}O_{3.55}$, $SnPCs_{0.05}Mg_{0.05}F_{0.1}O_{3.53}$, $Sn_{1.1}Al_{0.4}B_{0.2}P_{0.6}Ba_{0.08}F_{0.08}O_{3.54}$, $Sn_{1.1}Al_{0.4}B_{0.2}P_{0.6}Li_{0.1}K_{0.1}Ba_{0.1}F_{0.1}O_{3.65}$, $Sn_{1.1}Al_{0.4}B_{0.4}P_{0.4}Ba_{0.08}O_{3.34}$, $Sn_{1.1}Al_{0.4}PCs_{0.05}O_{4.23}$, $Sn_{1.1}Al_{0.4}PK_{0.05}O_{4.23}$,
$Sn_{1.2}Al_{0.5}B_{0.3}P_{0.4}Cs_{0.2}O_{3.5}$,
$Sn_{1.2}Al_{0.4}B_{0.2}P_{0.6}Ba_{0.08}O_{3.68}$,
$Sn_{1.2}Al_{0.4}B_{0.2}P_{0.6}Ba_{0.08}F_{0.08}O_{3.64}$,
$Sn_{1.2}Al_{0.4}B_{0.2}P_{0.6}Mg_{0.04}Ba_{0.04}O_{3.68}$,
$Sn_{1.2}Al_{0.4}B_{0.3}P_{0.5}Ba_{0.08}O_{3.58}$,
$Sn_{1.3}Al_{0.3}B_{0.3}P_{0.4}Na_{0.2}O_{3.3}$,
$Sn_{1.3}Al_{0.2}B_{0.4}P_{0.4}Ca_{0.2}O_{3.4}$,
$Sn_{1.3}Al_{0.4}B_{0.4}P_{0.4}Ba_{0.2}O_{3.6}$, $Sn_{1.4}Al_{0.4}PK_{0.2}O_{4.6}$,
$Sn_{1.4}Al_{0.2}Ba_{0.1}PK_{0.2}O_{4.45}$, $Sn_{1.4}Al_{0.2}Ba_{0.2}PK_{0.2}O_{4.6}$,
$Sn_{1.4}Al_{0.4}Ba_{0.2}PK_{0.2}Ba_{0.1}F_{0.2}O_{4.9}$,
$Sn_{1.4}Al_{0.4}PK_{0.3}O_{4.65}$, $Sn_{1.5}Al_{0.2}PK_{0.2}O_{4.4}$,
$Sn_{1.5}Al_{0.4}PK_{0.1}O_{4.65}$, $Sn_{1.5}Al_{0.4}PCs_{0.05}O_{4.63}$,
$Sn_{1.5}Al_{0.4}PCs_{0.05}Mg_{0.1}F_{0.2}O_{4.63}$
$SnSi_{0.5}Al_{0.1}B_{0.2}P_{0.1}Ca_{0.4}O_{3.1}$, $SnSi_{0.4}Al_{0.2}B_{0.4}O_{2.7}$,
$SnSi_{0.5}Al_{0.2}B_{0.1}P_{0.1}Mg_{0.1}O_{2.8}$, $SnSi_{0.6}Al_{0.2}B_{0.2}O_{2.8}$,
$SnSi_{0.5}Al_{0.3}B_{0.4}P_{0.2}O_{3.55}$, $SnSi_{0.5}Al_{0.3}B_{0.4}P_{0.5}O_{4.30}$,
$SnSi_{0.6}Al_{0.1}B_{0.1}P_{0.3}O_{3.25}$, $SnSi_{0.6}Al_{0.1}B_{0.1}P_{0.1}Ba_{0.2}O_{2.95}$.
$SnSi_{0.6}Al_{0.1}B_{0.1}P_{0.1}Ca_{0.2}O_{2.95}$,
$SnSi_{0.6}Al_{0.4}B_{0.2}Mg_{0.1}O_{3.2}$, $SnSi_{0.6}Al_{0.1}B_{0.3}P_{0.1}O_{3.05}$,
$SnSi_{0.6}Al_{0.2}Mg_{0.2}O_{2.7}$, $SnSi_{0.6}Al_{0.2}Ca_{0.2}O_{2.7}$,
$SnSi_{0.6}Al_{0.2}P_{0.2}O_{3}$,
$SnSi_{0.6}B_{0.2}P_{0.2}O_{3}$, $SnSi_{0.8}Al_{0.2}O_{2.9}$,
$SnSi_{0.8}Al_{0.3}B_{0.2}P_{0.2}O_{3.85}$, $SnSi_{0.8}B_{0.2}O_{2.9}$,
$SnSi_{0.8}Ba_{0.2}O_{2.8}$, $SnSi_{0.8}Mg_{0.2}O_{2.8}$, $SnSi_{0.8}Ca_{0.2}O_{2.8}$,
$SnSi_{0.8}P_{0.2}O_{3.1}$
$Sn_{0.9}Mn_{0.3}B_{0.4}P_{0.4}Ca_{0.1}Rb_{0.1}O_{2.95}$,
$Sn_{0.9}Fe_{0.3}B_{0.4}P_{0.4}Ca_{0.1}Rb_{0.1}O_{2.95}$,
$Sn_{0.8}Pb_{0.2}Ca_{0.1}P_{0.9}O_{3.35}$, $Sn_{0.3}Ge_{0.7}Ba_{0.1}P_{0.9}O_{3.35}$,
$Sn_{0.9}Mn_{0.1}Mg_{0.1}P_{0.9}O_{3.35}$, $Sn_{0.2}Mn_{0.8}Mg_{0.1}P_{0.9}O_{3.35}$,
$Sn_{0.7}Pb_{0.3}Ca_{0.1}P_{0.9}O_{3.35}$, $Sn_{0.2}Ge_{0.8}Ba_{0.1}P_{0.9}O_{3.35}$.

The chemical formula of the compound as obtained by calcination can be determined by inductively coupled plasma (ICP) emission spectroscopic analysis or, more conveniently, by calculation making use of the difference in powder weight between before and after the calcination.

A light metal is intercalated into the negative electrode material till the electrode potential approximates to the precipitating potential of that light metal. For example, the amount intercalated is preferably 50 to 700 mol%, still preferably 100 to 600 mol%, per the negative electrode material. The amount deintercalated is preferably as much as possible with reference to the amount intercalated. Intercalation of a light metal is preferably performed by an electrochemical process, a chemical process or a thermal process. The electrochemical process or the chemical process is preferred. The electrochemical process is preferably carried out by electrochemically inserting the light metal present in the positive electrode active material or directly inserting a light metal from a light metal or an alloy thereof. The chemical process can be carried out by mixing or contacting the negative electrode material with a light metal or reacting the negative electrode material with an organometallic compound, e.g., butyl lithium. Lithium or a lithium ion is a particularly preferred light metal to be used.

The negative electrode material of the present invention may contain various compounds as a dopant, such as a compound of a lanthanide metal (e.g., Hf, Ta, W, Re, Os, Ir, Pt, Au, and Hg) and a compound affording improved electron conductivity (e.g., Sb, In or Nb compounds). The total amount of these dopant compounds added is preferably up to 5 mol%.

The surface of the oxide as a positive electrode active material or the negative electrode material may be coated with an oxide having a different chemical formula from the positive electrode active material or the negative electrode material. The surfacing oxide is preferably one containing a compound soluble in both an acidic solution and an alkaline solution. The surfacing oxide is still preferably a metal oxide having high electron conductivity. Such metal oxides include $PbO_2$, $Fe_2O_3$, $SnO_2$, $In_2O_3$, and $ZnO$. It is also preferable to incorporate a dopant (e.g., a metal having different valence as an oxide, a halogen atom, etc.) into these oxides. Particularly preferred of them are $SiO_2$, $SnO_2$, $Fe_2O_3$, $ZnO$, and $PbO_2$.

The amount of the surfacing metal oxide is preferably 0.1 to 10% by weight, still preferably 0.2 to 5% by weight, particularly preferably 0.3 to 3% by weight, based on the positive electrode active material or the negative electrode material.

The surface of the positive electrode active material or the negative electrode material may be modified by treating with, for example, an esterifying agent, a chelating agent, a conductive high polymer, polyethylene oxide, and the like.

The surface of the negative electrode material may also be modified by, for example, providing a layer comprising an ion-conductive polymer or polyacetylene. The positive electrode active material or the negative electrode material may be subjected to a purification process, such as washing with water.

In addition to the positive electrode active material or a negative electrode material, the electrode material mixture can contain an electrically conducting agent (hereinafter simply referred to as a conducting agent), a binder, a dispersant, a filler, an ion-conductive agent, a pressure increasing agent, and other additives.

The conducting agent to be used can be any electron conducting material which undergoes no chemical change in an assembled battery. Useful conducting agents include natural graphite (scale graphite, flake graphite, and lumpy graphite); artificial graphite; carbon black, such as acetylene black, Ketjen black, channel black, furnace black, lamp black, and thermal black; electrically conductive fibers, such as carbon fiber and metal fiber; metal powders, such as powder of copper, nickel, aluminum or silver; electrically conductive whiskers, such as zinc oxide whiskers and potassium titanate whiskers; electrically conductive metal oxides, such as titanium oxide; and electrically conductive organic materials, such as polyphenylene derivatives. These conducting agents can be used either individually or as a mixture thereof. Particularly preferred of these conducting agents is acetylene black or a combination of graphite and acetylene black. In preparing an electrode material mixture as a water-dispersion paste, it is advantageous to previously disperse the conducting agent in water before mixing with other components.

While not limiting, the conducting agent is preferably used in an amount of 1 to 50%, particularly preferably 1 to 30%, by weight based on the electrode material mixture. In particular, carbon black or graphite is preferably used in an amount of 2 to 15% by weight.

The binder which can be used in the electrode material mixture layer and the layer containning no positive electrode active material or no negative electrode mayterial includes polysaccharides, thermoplastic resins, and polymers having a rubber-like elasticity or mixtures thereof. Examples of suitable binders include starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, an ethylene-propylene-diene terpolymer (EPDM), sulfonated EPDM, a styrene-butadiene rubber, polybutadiene, a fluorine rubber, and polyethylene oxide. In using a compound having a functional group reactive with lithium, such as a polysaccharide, it is preferable to deactivate the functional group by addition of a compound having, for example, an isocyanate group. While not limiting, the binder is preferably used in an amount of 1 to 50% by weight, still preferably 2 to 30% by weight. The distribution of the binder in the electrode material mixture may be either uniform or non-uniform.

Polymers having a decomposition temperature of 300° C. or more are preferred as binders. Examples of such polymers include polyethylene, polypropylene, polytetrafluoroethylene (PTFE), polyvinylidene fluoride (PVDF), a tetrafluoroethylene-hexafluoropropylene copolymer (FEP), a tetrafluoroethylene-perfluoroalkyl vinyl ether copolymer (PFA), a vinylidene fluoride-hexafluoropropylene copolymer, a vinylidene fluoride-chlorotrifluoroethylene copolymer, an ethylene-tetrafluoroethylene copolymer (ETFE resin), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexaflfuoropropylene-tetrafluoroethylene copolymer, and a vinylidene fluoride-perfluoromethyl vinyl ether-tetrafluoroethylene copolymer.

The filler to be used in the present invention is hot particularly limited as long as it is a fibrous material which undergoes no chemical change in an assembled battery. Fibers of polyolefins (e.g., polypropylene or polyethylene), glass fiber, and carbon fiber are usually used. While not limiting, the filler is preferably used in an amount of up to 30% by weight.

Compounds known as an organic or inorganic solid electrolyte can be used as an ion-conductive agent. The particulars of ion-conductive agents are described later with respect to an electrolytic solution. The pressure increasing agent used in the present invention is a compound capable of increasing the inner pressure as hereinafter described. Carbonates may be mentioned as a typical example.

The electrolytic solution used in the present invention is generally composed of a solvent and a lithium salt (composed of an anion and a lithium cation) soluble in the solvent. Examples of suitable solvents include aprotic organic solvents, such as propylene carbonate, ethylene carbonate, butylene carbonate, dimethyl carbonate, diethyl carbonate, methylethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, and 1,3-propanesultone. These solvents may be used either individually or as a mixture of two or more thereof. Examples of suitable cations of the lithium salts soluble in these solvents include $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}C_{10}^{2-}$, (1,2-dimethoxyethane)$_2ClO_4^-$, lower aliphatic carboxylate ions, $AlCl_4^-$, $Cl^-$, $Br^-$, $I^-$, anions of chloroboran compounds, and tetraphenylborate ions. These lithium salts may be used either individually or as a combination of two or more thereof. The electrolytic solution preferably contains, as a solvent, a cyclic carbonate (e.g., ethylene carbonate or propylene carbonate) and/or an acyclic carbonate (e.g., diethyl carbonate, dimethyl carbonate, or methyl ethyl carbonate). In particular, the electrolytic solution preferably comprises a supporting electrolyte containing $LiCF_3SO_3$, $LiClO_4$, $LiBF_4$ and/or $LiPF_6$ and a mixed solvent of ethylene carbonate and propylene carbonate, 1,2-dimethoxyethane, dimethyl carbonate or diethyl carbonate at an appropriate mixing ratio. A supporting salt containing $LiPF_6$ is especially preferred.

The amount of the electrolytic solution to be used in a battery is not particularly limited and can be determined according to the amounts of the positive electrode active material and the negative electrode material or the size of the battery.

While not limiting, the concentration of the supporting electrolyte is preferably from 0.2 to 3 mol per liter of the electrolytic solution.

In addition to the above-mentioned electrolytic solution, organic or inorganic solid electrolytes may also be employed. Examples of suitable inorganic solid electrolytes include lithium nitride, a lithium halide, and a lithium oxyacid salt. Among them, $Li_3N$, $LiI$, $Li_5NI_2$, $Li_3N$—$LiI$—$LiOH$, $Li_4SiO_4$, $Li_4SiO_4$—$LiI$—$LiOH$, $xLi_3PO_4$—$(1-x)Li_4SiO_4$, $Li_2SiS_3$, and phosphorus sulfide compounds are effective.

Examples of effective organic solid electrolytes include polyethylene oxide derivatives or polymers containing the same, polypropylene oxide derivatives or polymers containing the same, polymers containing an ion dissociation group, a mixture of a polymer containing an ion dissociation group and the above-mentioned aprotic electrolytic solution, phosphoric ester polymers, and high polymer matrix materials containing an aprotic polar solvent. Polyacrylonitrile may be added to the electrolytic solution. A combined use of an organic solid electrolyte and an inorganic solid electrolyte is also known.

The electrolytic solution may contain other compounds for improving charge and discharge characteristics, such as pyridine, triethyl phosphite, triethanolamine, a cyclic ether, ethylenediamine, n-glyme, hexaphosphoric triamide, a nitrobenzene derivative, sulfur, a quinoneimine dye, an N-substituted oxazolidinone and an N,N'-substituted imidazolidinone, an ethylene glycol dialkyl ether, a quaternary ammonium salt, polyethylene glycol, pyrrole, 2-methoxyethanol, $AlCl_3$, a monomer providing an electric conductive polymer as an electrode active material, triethylenephosphoramide, a trialkylphosphine, morpholine, an aryl compound having a carbonyl group, a crown ether (e.g., 12-crown-4), hexamethylphosphoric triamide and a 4-alkylmorpholine, a bicyclic tertiary amine, an oil, a quaternary phosphonium salt, and a tertiary sulfonium salt.

In order to make the electrolytic solution incombustible, a halogen-containing solvent, such as carbon tetrachloride or trifluorochloroethylene, may be added to the electrolytic solution. In order to make the electrolytic solution suitable to high-temperature storage, carbonic acid gas may be incorporated thereto.

The positive or negative electrode material mixture may contain an electrolytic solution or an electrolyte. For example, it is known to add the above-mentioned ion-conductive polymer, nitromethane, or an electrolytic solution to the electrode material mixture.

As a separator, an insulating finely porous thin film having high ion permeability and prescribed mechanical strength is used. The film preferably has such a function that the pores are closed at 80° C. or higher to increase the resistance. A sheet or nonwoven fabric made of an olefin polymer (e.g., polypropylene and/or polyethylene) or glass fiber is used for their organic solvent resistance and hydrophobic properties. The pore size of the separator is selected from the range generally used for batteries, e.g., from 0.01 to 10 μm. The thickness of the separator is selected from the range generally used for batteries, e.g., from 5 to 300 μm. The separator is prepared by making a synthesized polymer porous by a dry process, stretching, solution removal, solvent removal, or a combination thereof.

A current collector for an electrode active material may be made of any electron conductive substance which undergoes no chemical change in an assembled battery. Examples of suitable materials of a current collector for the positive electrode include stainless steel, nickel, aluminum, titanium, carbon; and aluminum or stainless steel surface-treated with carbon, nickel, titanium or silver. Aluminum or an aluminum alloy is particularly preferred. Examples of suitable materials of a current collector for the negative electrode include stainless steel, nickel, copper, titanium, aluminum, carbon; copper or stainless steel surface-treated with carbon, nickel, titanium or silver; and an Al—Cd alloy. Copper or a copper alloy is particularly preferred. These materials may be subjected to surface oxidation. It is desirable to make unevenness on the surface of the current collector by surface treatment. The current collector may have a variety of forms, such as a film, a foil, a sheet, a net, a punched sheet, a lath, a porous body, a foamed body, a fibrous body, and so on. While not limiting, the thickness of the current collector is from 1 to 500 μm.

The battery of the present invention may have any form, such as a sheet, a cylinder, a flat shape, an angular shape, and the like.

The positive or negative electrode material mixture is usually coated to the respective current collector, dried, and compressed. General coating techniques, such as reverse roll coating, direct roll coating, blade coating, knife coating, extrusion coating, curtain coating, gravure coating, bar coating, dip coating and squeeze coating, can be used. Blade coating, knife coating and extrusion coating techniques are preferred. Coating is preferably carried out at a speed of 0.1 to 100 m/min.

The coating technique should be chosen in agreement with the physical properties and drying properties of the coating composition of the electrode material mixture so as to form a coating layer having a satisfactory surface condition. The both sides of the current collector are coated either successively or simultaneously. The coating layer on each side may be continuous, discontinuous, or may have a stripe pattern. While the thickness, length and width of the coating layer depend on the size of the battery, a preferred thickness after drying and compressing is 1 to 2000 μm per side.

Drying or dehydration of a coated sheet is conducted by a generally employed means, preferably hot air, vacuum, infrared rays, far infrared rays, electron beams, and low humidity air, either alone or a combination thereof. The drying temperature preferably ranges from 80° to 350° C., and still preferably from 100° to 250° C. From the viewpoint of charge and discharge cycle characteristics, drying is preferably effected to such an extent that the positive and negative electrode material mixture layers and the electrolytic solution may each have a water content of not more than 500 ppm, with the total battery water content being not more than 2000 ppm.

Compression of the coated sheet may be carried out by a generally employed means, and preferably by pressing in a mold or calendering. While not limiting, the pressing pressure is preferably 0.2 to 3 t/cm$^2$. The pressing speed in calendering is preferably 0.1 to 50 m/min. The pressing temperature is preferably from room temperature to 200° C. The ratio of the width of the negative electrode sheet to that of the positive electrode sheet is preferably 0.9 to 1.1, particularly 0.95 to 1.0. The ratio of the content of the positive electrode active material to that of the negative electrode material cannot be specified because it depends on the kinds of compounds used and the mixing ratio in the preparation of the electrode material mixture. That ratio can be optimized with the capacity, cycle characteristics, and safety being taken into consideration.

A positive electrode sheet and a negative electrode sheet are laid one on another via a separator and put into a battery case in a rolled or folded form. The sheets and the case are electrically connected, an electrolytic solution is poured into the case, and the case is closed with a sealing plate. A safety valve may be used as a sealing plate. Various known safety elements may also be provided. For example, a fuse, a bimetal, a PTC element, etc. may be used as an element for over-current prevention. In addition to the safety valve, an increase in inner pressure may be coped with by making cuts on a battery case, making cracks in a gasket, making cracks in a sealing plate, or a mechanism of cut-off from a lead plate. A countermeasure against overcharge or overdischarge may be integrally incorporated into the circuit of a charger, or such a protective circuit may be separately connected to a charger. As a countermeasure against overcharge, the battery may be provided with a system of shutting off the current with an increase of the inner pressure. In this case, a compound which increases the inner pressure can be incorporated into the electrode material mixture or the electrolytic solution. Examples of such a pressure increasing agent include carbonates, such as $Li_2CO_3$, $LiHCO_3$, $Na_2CO_3$, $NaHCO_3$, $CaCO_3$, and $MgCO_3$.

A battery case and a lead plate are made of an electrically conductive metal or alloy, such as iron, nickel, titanium, chromium, molybdenum, copper, aluminum, and alloys thereof. The cap, case, electrode sheets and lead plate can be joined by a known welding technique, such as direct current or alternating current electric welding, laser welding or ultrasonic welding. Conventional compounds or mixtures known as a sealing compound, such as asphalt, can be used as a sealant for the battery.

Application of the nonaqueous secondary battery of the present invention is not particularly limited. For example, it is mounted in electronic equipment, such as notebook color or monochromatic personal computers, sub-notebook personal computers, pen touch computers, pocket (palm-top) personal computers, notebook word processors, pocket word processors, electronic book players, pocket phones, wireless phone extensions, pagers, handy terminals, portable facsimiles, portable copiers, portable printers, headphone stereos, video cameras, liquid crystal TV sets, handy cleaners, portable CD, mini disk systems, electrical shavers, machine translation systems, land mobile radiotelephones, transceivers, electrical tools, electronic notebooks, calculators, memory cards, tape recorders, radios, backup powers, and so on. For domestic use, it is useful in automobiles, electrically-powered vehicles, motors, lights, toys, family (home) computers, load conditioners, irons, watches, stroboscopic lamps, cameras, medical equipment (e.g., pacemakers, hearing aids, and massaging machines). It is also applicable to military equipment and spacecraft equipment. The nonaqueous secondary battery of the present invention may be used in combination with other secondary batteries, solar batteries or primary batteries.

In carrying out the present invention, it is desirable to combine the above-described preferred chemical materials and preferred battery constituent parts. Particularly preferred combinations are as follows. The positive electrode active material comprises at least one compound selected from the group consisting of $Li_xCoO_2$, $Li_xNiO_2$, $Li_xMnO_2$, and $Li_xMn_2O_4$ (wherein x=0.05 to 1.2), and the conducting agent comprises acetylene black. The positive electrode current collector is a net, a sheet, a foil, a lath, etc. made up of stainless steel or aluminum. The negative electrode material contains at least one compound containing metallic lithium, a lithium alloy (e.g., Li—Al), a carbonaceous compound, an oxide (e.g., $LiCoVO_4$, $SnO_2$, SnO, SiO, $GeO_2$, GeO, $SnSiO_3$, and $SnSi_{0.3}Al_{0.1}B_{0.2}P_{0.3}O_{3.2}$), a sulfide (e.g., $TiS_2$, $SnS_2$, SnS, $GeS_2$ and GeS), and the like. The negative electrode current collector is a net, a sheet, a foil, a lath, etc. made up of stainless steel or copper. The electrode material mixture containing the positive electrode active material or the negative electrode material may contain a carbonaceous material, such as acetylene black or graphite, as an electron-conductive agent. The binder is selected from fluorine-containing thermoplastic compounds, such as polyvinylidene fluoride and polyfluoroethylene, acrylic acid-containing polymers, elastomers, such as styrene-butadiene rubber and an ethylene-propylene terpolymer, and mixtures thereof. The electrolytic solution contains a combination of cyclic carbonates (e.g., ethylene carbonate) and acyclic carbonates (e.g., diethyl carbonate or dimethyl carbonate) or ester compounds (e.g., ethyl acetate) and, as a supporting electrolyte, $LiPF_6$. In addition, a lithium salt, such as $LiBF_4$ or $LiCF_3SO_3$, can be used in combination. The separator is made of polypropylene, polyethylene or a combination thereof. The shape of the battery may be any of a cylinder, a flat shape, and an angular shape. The battery is preferably provided with a means with which safety can be assured even in case of errors, such as a safety valve of inner pressure release type, a safety valve of current shut-off type, and a separator which increases its resistance at high temperatures.

The present invention will now be illustrated in greater detail with reference to Examples, but it should be understood that the invention is not construed as being limited thereto. Unless otherwise indicated, all the parts are by weight.

EXAMPLE 1

A mixture of 86 parts of $SnB_{0.2}P_{0.5}K_{0.1}Mg_{0.1}Ge_{0.1}O_{2.8}$ (negative electrode material), 3 parts of acetylene black (conducting agent), 6 parts of graphite (conducting agent), 4 parts of polyvinylidene fluoride (binder), and 1 part of carboxymethyl cellulose (binder) was kneaded with water to prepare a slurry. The slurry was applied to both sides of a 10 μm thick copper foil by extrusion coating, dried, and compressed by calendering to obtain a negative electrode sheet 2 having a width of 55 mm, a length of 490 mm, and a thickness of 82 μm.

A mixture of 87 parts of $LiCoO_2$ (positive electrode active material), 3 parts of acetylene black (conducting agent), 6 parts of graphite (conducting agent), 3 parts of Nipol 820B (a binder resin produced by Nippon Zeon Co., Ltd.), and 1 part of carboxymethyl cellulose (binder) was kneaded with water to prepare a slurry (A) of a positive electrode material mixture.

A mixture of 94 parts of a mixed powder consisting of electron conductive particles and electron non-conductive particles shown in Table 1 below at the mixing ratio shown, 4 parts of polyvinylidene fluoride, and 2 parts of carboxymethyl cellulose was kneaded with water to prepare a slurry (B) for a layer containing no positive electrode active material or no negaive electrode material.

Slurry (A) and slurry (B) were successively applied to each side of a 20 μm thick aluminum foil by extrusion coating to form a positive electrode sheet 1 having a width of 53 mm, a length of 445 mm, and a thickness of 260 μm which was composed of a single positive electrode material mixture layer A as an uppermost layer and a layer B containing no positive electrode active material or no negative electrode material as an lowermost layer or an upper positive electrode material mixture layer A and a lower positive electrode material mixture layer A' and a layer B containing no positive electrode material or no negative electrode material sandwiched therebetween on each side, the thickness of each layer being shown in Table 1. That is, in No. 1, layer B is provided on the current collector, in Nos. 2 to 10, layer B is provided between layers A and A' in No. 11, layer B is provided on layer A' and in No. 12, layer A only is provided on the current collector. In Run No. 11, the positive electrode sheet 1 had a layer B containing no positive electrode active material or no negative electrode material as an upper layer and a single positive electrode material mixture layer A as a lower layer. In Run No. 10, a layer B containing no positive electrode active material or no negative electrode material was not provided.

A nickel lead plate and an aluminum lead plate were welded onto the end of the negative electrode sheet 2 and the positive electrode sheet 1, respectively, and the electrode sheets were heat treated at 230° C. for 1 hour by means of a far infrared heater in a dry air atmosphere having a dew point of −40° C. or lower. The positive electrode sheet 1, a finely porous polyethylene/polypropylene film separator 3, the negative electrode sheet 2, and the separator 3 were laid, one on top of the other, in this order and rolled up into a cylinder. The state of the positive electrode sheet during rolling was observed to see whether cracks of the sheet or fall-off of the electrode material mixture might occur. The results of the observation are shown in Table 1.

Figure 1:
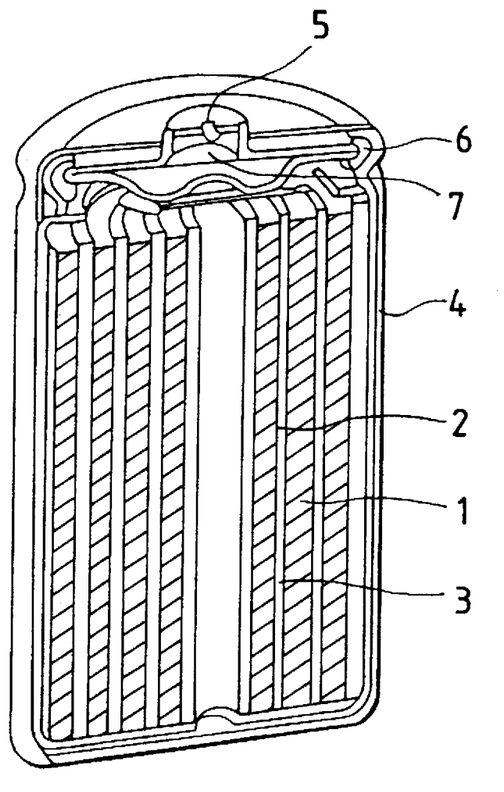
FIG. 1 is a cross-sectional view of a general cylindrical battery.

The cylinder was put in a nickel-plated iron-made open top battery case 4, and an electrolytic solution comprising a 2:8 (by weight) mixed solvent of ethylene carbonate and diethyl carbonate and 1 mol/l of $LiPF_6$ as an electrolyte was poured into the case. A cap 5 serving as a positive electrode terminal was fitted to the open top via a gasket 6 to prepare a cylindrical battery having a height of 65 mm and an outer diameter of 18 mm. The positive electrode terminal 5 had previously been connected to the positive electrode sheet 1, and the battery case 4 to the negative electrode sheet 2, respectively, via respective lead terminals. The reference numeral 7 in FIG. 1 indicates a safety valve.

The resulting battery was charged at 1 $mA/cm^2$ to 4.2 V and then discharged to 2.8 V at a discharge current of 1 $mA/cm^2$ or 5 $mA/cm^2$. The dependence of discharge current density was calculated. The results are shown in Table 1.

TABLE 1

| | Layer (B) | | Layer (B)/ | | Dependance of | | |
|---|---|---|---|---|---|---|---|
| Run No. | Electron Conductive Particles (part) | Electron Non-conductive Particles (part) | Layer (A + A') Thickness Ratio* (%) | Layer (A)/ Layer (A') Ratio* | Cracks in Positive Electrode Sheet | Discharge Current Density (%) | Remarks |
| 1 | graphite (20) | aluminum oxide (80) | 4 | 10/0 | none | 88 | Invention |
| 2 | " | aluminum oxide (80) | 4 | 7/3 | " | 87 | " |
| 3 | " | aluminum oxide (80) | 4 | 3/7 | " | 87 | " |
| 4 | graphite (10) | titanium oxide (90) | 6 | 10/0 | " | 86 | " |
| 5 | graphite (8) | zirconium oxide (92) | 3 | 9/1 | " | 88 | " |
| 6 | acetylene black (5) | silicon dioxide (95) | 8 | 8/2 | " | 87 | " |
| 7 | acetylene black (4) | smectite (96) | 7 | 10/0 | " | 86 | " |
| 8 | Ketjen black (2) | titanium oxide (98) | 10 | 10/0 | " | 86 | " |
| 9 | graphite (10) | kaolinite (90) | 8 | 9/1 | " | 87 | " |
| 10 | graphite (40) | pyrophyllite (60) | 20 | 2/8 | " | 85 | " |
| 11 | graphite (20) | aluminum oxide (80) | 4 | 0/10 | " | 79 | " |
| 12 | nil | nil | — | — | observed | 84 | Comparison |

*Layer (A): upper positive electrode material mixture layer;
Layer (A'): lower positive electrode material mixture layer;
Layer (B): layer containing no positive electrode active material or no negative electrode material As is apparent from the results in Table 1, the batteries according to the present invention in which a layer containing no positive electrode active material or no negative electrode material is provided in the positive sheet or negative sheet prevents generation of crack in rolling up. It is also seen that when the layer containing no positive electrode active material or no negative electrode material is provided between the upper and lower electrode material mixture layers or as a lowermost layer on the current collector, more effective dependence of discharge current density can be obtained.

While the invention has been described in detail and with reference to specific examples thereof, it will be apparent to one skilled in the art that various changes and modifications can be made therein without departing from the spirit and scope thereof.

What is claimed is:

1. A nonaqueous secondary battery comprising a positive electrode sheet having on a current collector an electrode material mixture layer containing a lithium-containing transition metal oxide as a positive electrode active material, a negative electrode sheet having on a current collector an electrode material mixture layer containing a negative electrode material capable of intercalating and deintercalating lithium, and a nonaqueous electrolyte containing a lithium salt, wherein in at least one of said positive electrode sheet and said negative electrode sheet, in the case of said positive sheet, a layer containing no positive electrode active material is provided between plural electrode material mixture layers containing the positive electrode active material or between the electrode material mixture layer and the current collector; and in the case of said negative electrode sheet, a layer containing no negative electrode material capable of intercalating and deintercalating lithium is provided between plural electrode material mixture layers containing the negative electrode material or between the electrode material mixture layer and the current collector.

2. The nonaqueous secondary battery as claimed in claim 1, wherein at least one of said layer containing no positive electrode active material or no negative electrode material is further provided on said electrode material mixture layer.

3. The nonaqueous secondary battery as claimed in claim 1, wherein a ratio of the coating weight of said electrode material mixture layer which is located above said layer containing no positive electrode active material or no negative electrode material to the coating weight of an electrode material mixture layer which is located under said layer containing no positive electrode active material or no negative electrode material is from 10:0 to 1:9.

4. The nonaqueous secondary battery as claimed in claim 1, wherein said at least one of the positive electrode sheet and negative electrode sheet is a positive electrode sheet comprising said layer containing no positive electrode active material.

5. The nonaqueous secondary battery as claimed in claim 4, wherein said layer containing no positive electrode active material comprises at least one kind of electron conductive particles and at least one kind of electron non-conductive particles.

6. The nonaqueous secondary battery as claimed in claim 5, wherein said layer containing no positive electrode active material contains 1 to 50% by weight of said electron conductive particles and 50 to 99% by weight of said electron non-conductive particles.

7. The nonaqueous secondary battery as claimed in claim 5, wherein said electron conductive particles are particles consisting mainly of carbon, and said electron non-conductive particles are particles consisting mainly of an inorganic compound.

8. The nonaqueous secondary battery as claimed in claim 1, wherein said positive electrode material mixture contains at least one lithium-containing transition metal composite oxide as a positive electrode active material.

9. The nonaqueous secondary battery as claimed in claim 1, wherein said negative electrode material is a metal or semimetal oxide.

10. The nonaqueous secondary battery as claimed in claim 9, wherein said negative electrode material comprises at least one oxide of a metal or semimetal belonging to the groups 13 to 15 of the Periodic Table.

11. The nonaqueous secondary battery as claimed in claim 10, wherein said negative electrode material is a composite oxide represented by formula (I):

$$SnM^1_a O_t \qquad (I)$$

wherein $M^1$ represents two or more elements selected from the group consisting of Al, B, P, Si, Ge, the elements belonging to the groups 1, 2 and 3 of the Periodic Table, and halogen elements; a represents a number of form 0.2 to 2; and t represents a number of from 1 to 6.

12. The nonaqueous secondary battery as claimed in claim 11, wherein said composite oxide is represented by formula (IV):

$$SnM^3_c M^4_d O_t \qquad (IV)$$

wherein $M^3$ represents at least one element selected from the group consisting of Al, B, P, and Ge; $M^4$ represents at least one element selected from the group consisting of the elements belonging to the groups 1, 2 and 3 of the Periodic Table, and halogen elements; c represents a number of form 0.2 to 2; d represents a number of from 0.01 to 1; 0.2<c+d<2; and t represents a number of from 1 to 6.

* * * * *